(12) United States Patent
Kruglick

(10) Patent No.: US 9,358,466 B2
(45) Date of Patent: *Jun. 7, 2016

(54) CACHE-INFLUENCED VIDEO GAMES

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,645

(22) Filed: Jun. 2, 2015

(65) Prior Publication Data

US 2015/0258437 A1    Sep. 17, 2015

Related U.S. Application Data

(63) Continuation of application No. 14/119,171, filed as application No. PCT/US2013/043575 on May 31, 2013, now Pat. No. 9,079,108.

(51) Int. Cl.
*A63F 13/00* (2014.01)
*A63F 13/35* (2014.01)
*A63F 13/63* (2014.01)
*A63F 13/47* (2014.01)
*A63F 13/33* (2014.01)
(Continued)

(52) U.S. Cl.
CPC ............... *A63F 13/35* (2014.09); *A63F 13/00* (2013.01); *A63F 13/33* (2014.09); *A63F 13/47* (2014.09); *A63F 13/60* (2014.09); *A63F 13/63* (2014.09); *A63F 13/795* (2014.09)

(58) Field of Classification Search
CPC ......... A63F 13/00; A63F 13/33; A63F 13/35; A63F 13/47; A63F 13/60
USPC ........................................................... 463/42
See application file for complete search history.

(56) References Cited

U.S. PATENT DOCUMENTS

2005/0131825 A1    6/2005    Vijay
2007/0006275 A1    1/2007    Wright et al.
(Continued)

FOREIGN PATENT DOCUMENTS

WO    2014193403 A1    12/2014

OTHER PUBLICATIONS

Amazon Web Services, "Amazon ElastiCache," Amazon Web Services, accessed at http://aws.amazon.com/elasticache/, accessed on May 29, 2013, pp. 1-8.

(Continued)

*Primary Examiner* — Corbett B Coburn
(74) *Attorney, Agent, or Firm* — Jensen & Puntigam, PS

(57) ABSTRACT

Technologies related to cache-influenced video games are generally described. In some examples, the content of video game outputs as experienced by players of a video game may be adaptively modified to make more effective use of digital assets that are loaded in a computing system cache. Cache-influenced video games may increase cache use by increasing use, within a video game, of digital assets in a cache relative to assets not in the cache, e.g., assets that are on disk or in database storage. Cached digital assets can be retrieved more efficiently than assets stored elsewhere, and therefore video game performance may be improved.

21 Claims, 7 Drawing Sheets

(51) Int. Cl.
*A63F 13/60* (2014.01)
*A63F 13/795* (2014.01)

(56) References Cited

U.S. PATENT DOCUMENTS

| | | | |
|---|---|---|---|
| 2012/0115579 A1 | 5/2012 | Buecheler et al. | |
| 2013/0137518 A1* | 5/2013 | Lucas | A63F 13/12 463/42 |
| 2013/0203496 A1* | 8/2013 | Kruglick | A63F 9/24 463/42 |
| 2013/0260891 A1* | 10/2013 | Kruglick | A63F 13/12 463/42 |
| 2014/0066176 A1* | 3/2014 | LeTourneau | A63F 13/10 463/23 |
| 2014/0206452 A1* | 7/2014 | Bambino | A63F 13/00 463/40 |
| 2014/0357379 A1 | 12/2014 | Kruglick | |

OTHER PUBLICATIONS

Amazon Web Services, "Amazon Elastic Block Store (EBS) Pricing," accessed at http://aws.amazon.com/pricing/ebs/, accessed on May 29, 2013, pp. 1-2.
Google, "Memcached Client API's / libraries," Memcached, accessed at http://code.google.com/p/memcached/wiki/Clients, accessed on May 29, 2013, pp. 1-7.
Daily Server Porn, "Featuring the best in daily server, cables, parts & rack goodness from datacenters around the globe," accessed at http://web.archive.org/web/20130518015557/http://porn.serverbear.com/, accessed on Nov. 6, 2013, pp. 1-7.
Yokai, "Full Suite of Upgrades to the Tranquility DB—Yippie!," BattleClinic Fight Smart, accessed at http://eve.battleclinic.com/news/140114-Full-Suite-of-Upgrades-to-the-Tranquility-DB-Yippie.html, accessed on May 29, 2013, pp. 1-11.
Google, "Memcached New Programming," accessed at http://code.google.com/p/memcached/wiki/NewProgramming, accessed on May 29, 2013, pp. 1-4.
Elder Scrolls Wiki "Radiant Story," accessed at http://elderscrolls.wikia.com/wiki/Radiant_Story, accessed on May 29, 2013, p. 1.
Google, "Memcached Tutorial Caching Story," accessed at http://code.google.com/p/memcached/wiki/TutorialCachingStory, accessed on May 29, 2013, pp. 1-10.
Google, "Using Memcache," accessed at https://developers.google.com/appengine/docs/python/memcache/usingmemcache, accessed on May 29, 2013, pp. 1-4.
Hamilton, K., "Skyrim Will Have Infinite Randomly Generated Content. But Will It Ever Feel as Real as Minecraft?," accessed at http://kotaku.com/5858056/skyrim-will-have-infinite-randomly-generated-content-but-will-it-ever-feel-as-real-as-minecraft, Nov. 9, 2011, pp. 1-6.
International Search Authority, "International Search Report with Written Opinion for International Application No. PCT/US2013/043575," mailed on Oct. 22, 2013, 12 pages.
Lee, J., et al. "CISS: An Efficient Object Clustering Framework for DHT-Based Peer-to-Peer Applications," Databases, Information Systems, and Peer-to-Peer Computing Lecture Notes in Computer Science, vol. 3367, pp. 215-229, Springer-Verlag Berlin Heidelberg (2005).
Liang, "Avatar Mobility in Networked Virtual Environments: Measurements, Analysis, and Implications," Article, Jul. 15, 2008, 9 pages.
Schreier, J., "Skyrim Will Have Infinite Quests, Director Says," accessed at http://www.wired.com/gamelife/2011/11/skyrim-infinite-quests/, accessed on May 29, 2013, pp. 1-11.
World of Warcraft, "Picture of World of Warcraft Lightbringer Server Blade," 2007, 1 page.
Zhu, T., et al. "Saving Cash by Using Less Cache," USENIX Workshop on Hot Topics in Cloud Computing (HotCloud), 5 pages (2012).
"Memcached Tech Talk," accessed at https://www.facebook.com/video/video.php?v=631826881803, posted on Dec. 17, 2008, pp. 1-2.

* cited by examiner

CACHE-INFLUENCED VIDEO GAMES

CROSS-REFERENCE TO RELATED APPLICATIONS

This application is a continuation under 35 U.S.C. §120 of U.S. patent application Ser. No. 14/119,171 entitled "CACHE-INFLUENCED VIDEO GAMES", filed on Nov. 20, 2013, now U.S. Pat. No. 9,079,108, which is a U.S. National Stage Application filing under 35 U.S.C. §371 of International Application PCT/US13/43575, entitled "CACHE-INFLUENCED VIDEO GAMES", filed on May 31, 2013. The disclosures of parent U.S. Patent Application and International Application are incorporated by reference herein in their entirety.

BACKGROUND

Unless otherwise indicated herein, the materials described in this section are not prior art to the claims in this application and are not admitted to be prior art by inclusion in this section.

Today's video games are often impressive works of audiovisual artistry, in which video game players may encounter digital assets such as buildings, scenery, characters, vehicles, weapons, and the like. Video game players may also be provided with digital assets including short movie-like segments that build context for a game or mission. Digital assets provided to video game players may occasionally be provided in high-definition formats and may furthermore be provided in two dimensional (2D) and/or three dimensional (3D) formats. Providing such digital assets makes extensive use of computer memory resources such as cache and disk or database storage.

Also, video games are increasingly accessed over networks such as the Internet. Video game content, or portions of video game content, including digital assets such as those listed above, may be downloaded and/or streamed to a game player's computing device as the video game is played. In some cases, Massive Multiplayer Online Games (MMOGs) may allow for multiple video game players to interact with one another, in real-time or otherwise, in environments comprising a same or similar set of digital assets.

Therefore, by way of example, there is an ongoing need in the industry to improve technologies relating to providing digital assets for video games, whether such games are multiplayer games accessed over networks, or otherwise.

SUMMARY

The present disclosure generally describes technologies including devices, methods, and computer readable media relating to cache-influenced video games. Cached digital assets can generally be retrieved more efficiently than digital assets stored elsewhere, such as on disk or in a database, and therefore video game performance may be improved by increasing re-use rates of cached digital assets.

Some example methods may comprise providing cache-influenced video games adapted to increase a re-use rate of digital assets in a computing system cache by raising probabilities of using, within the video game, digital assets in the cache relative to digital assets not in the cache. Methods may comprise identifying, by a computing system, one or more digital assets in a cache; adjusting relative probabilities of using, within the video game, digital assets by raising probabilities associated with the digital assets in the cache relative to digital assets not in the cache; selecting digital assets to include in video game outputs using the adjusted relative probabilities of digital assets to increase a re-use rate of digital assets in the cache; and providing video game outputs including the selected digital assets for video game playback.

In some embodiments, cache-influenced video games may comprise multiplayer online games supported by web servers, and the cache accessed by the web servers may comprise a caching tier, e.g., a caching tier in a data center hosting a multiplayer online game. Digital assets loaded in the caching tier for a first player of the multiplayer online game may affect asset selection probabilities for other players of the multiplayer online game, e.g., increasing the probability that digital assets loaded in the caching tier may be selected for inclusion in video game outputs for multiple players. Furthermore, some embodiments may control diversity of video game content, while also benefiting from increased cache use, for example by raising probabilities associated with some digital assets relative to others to diversify digital assets selected to include in video game outputs.

Some example methods may comprise performing cache-influenced video game mission selection. A set of mission input parameters such as a player parameter, a difficulty parameter, and/or a faction parameter may be used to generate multiple different video game missions. Cache performance of the multiple different video game missions may be scored, e.g., by identifying digital assets used by the video game missions, and determining whether the identified digital assets are in a computing system cache. For video game missions comprising multiple different paths, cache performance may be scored for the multiple different paths available within the video game missions. Cache performance scores may be used, optionally along with other criteria such as diversity as appropriate; to select a video game mission from among the multiple different video game missions to increase a re-use rate of digital assets in the cache. The selected video game mission may be provided for video game playback.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may comprise a processor, a memory, and cache-influenced video game technologies configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
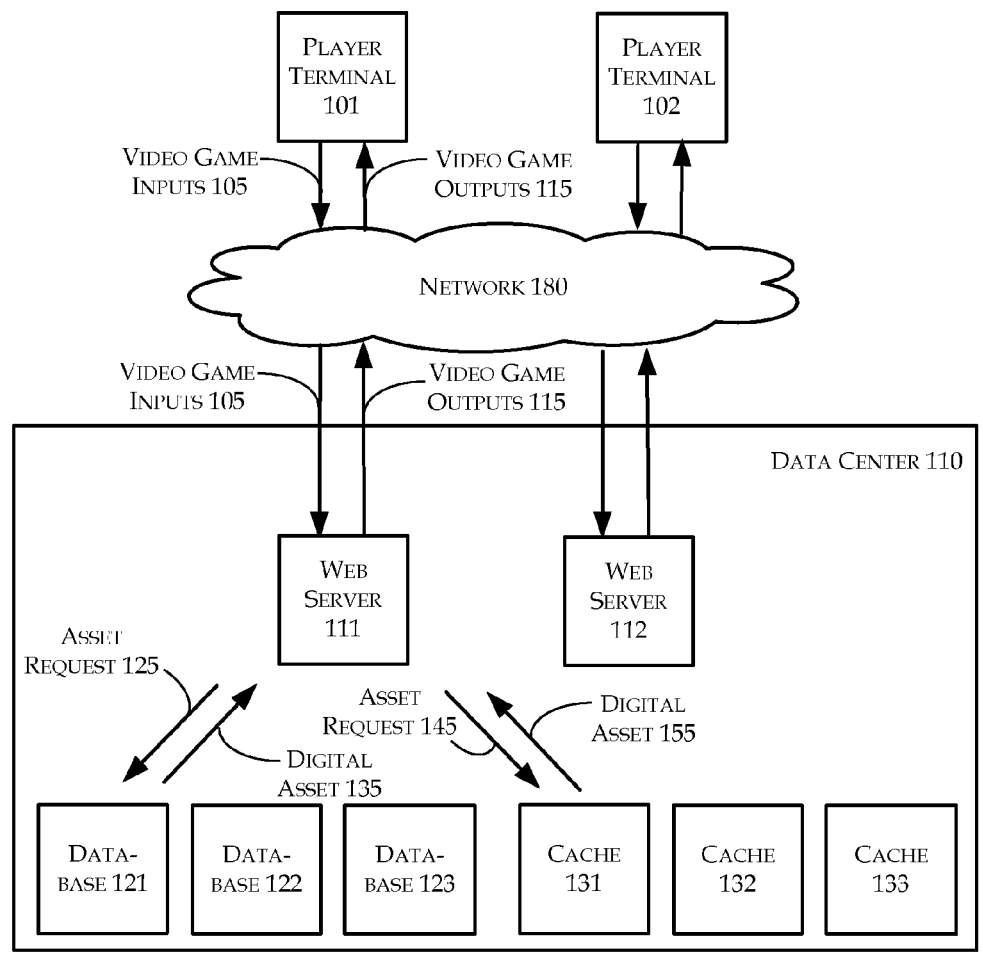
FIG. 1 is a block diagram illustrating example player terminals interacting with web servers in a datacenter to play a multiplayer video game.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to cache-influenced video games. In some examples, the content of video game outputs as experienced by players of a video game may be adaptively modified to make more effective use of digital assets that are loaded in a computing system cache. Cache-influenced video games may increase cache use by increasing use, within a video game, of digital assets in a cache relative to digital assets not in the cache, e.g., assets that are on disk or in database storage. Cached digital assets can be retrieved more efficiently than digital assets stored elsewhere, and therefore video game performance may be improved.

Two example technical approaches are disclosed in detail herein, understanding that variations and/or combinations of the disclosed approaches will be appreciated by those of skill in the art with the benefit of this disclosure. In a first technical approach, cache-influenced video games may increase cache use by raising probabilities of using digital assets in a cache relative to digital assets not in the cache. In a second technical approach, cache-influenced video games may increase cache use by cache-influenced video game mission selection. Each of these technical approaches is described in further detail herein. Either or both of the disclosed technical approaches may be used in the context of multiplayer online games, or in the context of standalone computing devices that may be, but are not necessarily connected to a network. Disclosed embodiments are generally described in the context of multiplayer online games; understanding that those of skill in the art will appreciate that the teachings of this disclosure may be adapted for use in the context of standalone devices.

In embodiments according to the first technical approach, cache-influenced video games may increase cache use by raising probabilities of using digital assets in a cache relative to digital assets not in the cache. For example, a video game may include an encounter with a digital asset such as a building, a scenery element such as tree or a fire, a character, a vehicle, a weapon, a short movie segment, or other digital asset. Assume the digital asset to be a character for this example. In situations wherein any of multiple characters might be encountered, the video game may be adapted to use, or may employ a higher probability of using, a character that is present in a cache versus a different character that is not in the cache.

Example methods according to the first technical approach may comprise identifying, by a computing system, one or more digital assets in a cache. When the video game comprises a multiplayer online game, the computing system may comprise one or more web servers, and the cache may comprise a caching tier accessible by the web servers. Digital assets may be loaded in the caching tier for use during play of the multiplayer online game by any of the multiple players thereof. For example, a video game may load a character encountered by a first player in a caching tier. The presence of the character in the caching tier may be identified, which may cause the video game to increase the likelihood of other players also encountering the character as described herein.

Identifying digital assets in a cache may be done by any desired technique. In some embodiments, a direct querying technique may identify digital assets in the cache by querying the cache to retrieve keys corresponding to digital assets in the cache. In some embodiments, a cache-tracking technique may maintain a data structure identifying digital assets in the cache by updating the data structure when digital assets are loaded in the cache, and optionally removing digital assets from the data structure as they age, or occasionally updating the data structure using the direct querying technique.

After digital assets are identified in a cache, embodiments may adjust relative probabilities of using identified digital assets within the video game. Probabilities of using digital assets identified in the cache may be raised relative to digital assets not in the cache. It will be appreciated that a wide variety of techniques may be used to adjust probabilities of use. In some embodiments, adjusting relative probabilities of digital assets may comprise maintaining an asset probability table identifying digital assets and adjusted relative probabilities of the digital assets. The adjusted relative probabilities may comprise weights, scores, percentages, or any other adjustable variable. In some embodiments, probabilities may be toggled between one and zero to reflect whether a digital asset is, or is not, in the cache. In other embodiments, more complex scoring involving additional probability levels, such as zero, twenty five percent, fifty percent, seventy five percent, and one hundred percent, or anything in between, may be performed, e.g., in embodiments adapted to combine cache based probabilities with other parameters to produce a best overall digital asset selection.

In some embodiments, relative probabilities of digital assets may be additionally adjusted to account for factors other than availability of digital assets in a cache. For example, embodiments may additionally adjust relative probabilities of digital assets to diversify the digital assets provided in video game outputs, e.g., to provide a more diverse and interesting playback experience. Probabilities associated with some digital assets, e.g., digital assets not in the cache, digital assets not recently in the cache, and/or digital assets having low historical usage rates, may be raised relative to other digital assets to diversify digital assets selected for inclusion in video game outputs. Such embodiments may achieve increased cache re-use rates, while simultaneously maintaining diversity of digital assets in video game outputs.

Selecting digital assets to include in video game outputs may use the adjusted relative probabilities of digital assets, thereby effecting an increased re-use rate of digital assets in the cache. Video games may also use any of a wide range of other factors, beyond the presence or absence of a digital asset in a cache, in digital asset selection. Selecting digital assets to include in video game outputs may use cache-based adjusted relative probabilities of digital assets in combination with additional variables such as video game mission/level, player history, player standing, and player skill.

In some scenarios, digital assets within a video game may not be selectable—that is, the video game may force the use of a particular digital asset. For example, a particular mission or "level" of a video game may involve an encounter with a particular character. Such scenarios need not consult cache-based adjusted relative probabilities.

In some scenarios, digital assets within a video game may be constrained to a limited set of digital asset options. For example, a particular mission or "level" of a video game may involve an encounter with a character selected from a set of ten available characters, so long as the player has not previously encountered the character. Such scenarios may use cache-based adjusted relative probabilities to select a character from the set of available characters as determined by game mission and player history constraints. Player standing, player skill, and/or any other constraints may also be applied in digital asset selection, in combination with cache-based adjusted relative probabilities.

Video game outputs including selected digital assets may be provided for video game playback. For video games accessed online, such as multiplayer video games, video game outputs may be provided by streaming or otherwise transmitting video game outputs to a player terminal via a network. For video games played on standalone computing devices, video game outputs may be provided for example by displaying video game outputs on a display coupled with the computing device.

In embodiments according to the second technical approach, computing systems may provide cache-influenced video games at least in part by performing a cache-influenced video game mission selection process to select video game missions. The cache-influenced video game mission selection process may comprise using a set of mission input parameters to generate multiple different video game missions. Mission input parameters may comprise any one or more parameters used by a video game to generate missions. Mission input parameters may comprise, for example, a map, zone, or environment parameter in which a mission is to occur, a difficulty parameter which may for example be retrieved from player preference settings, a player parameter identifying a particular player or player attributes, and/or a faction parameter identifying a group or team of players, or attributes thereof such as number of players in the faction. Mission input parameters may be tailored to accommodate individual video games and this disclosure is not limited to the example mission input parameters disclosed herein.

In some embodiments, a set of mission input parameters may be included in a mission request, and the mission request may be submitted multiple times to a procedural mission generator. The procedural mission generator may be adapted to use mission templates that have roles to be filled, e.g., for opponents, allies, and locations. The procedural mission generator may be adapted to fill those roles based on mission input parameters. As a practical example, a template selector may pick a template such as "Player will navigate to <2 places>, face <2 opponents>, work with <1 ally> and achieve <1 goal>", where each of the roles of places, opponents, allies, and goals may have labels and/or levels of difficulty associated with them.

The procedural mission generator may generate a video game mission in response to each of the multiple mission requests, thereby generating multiple different video game missions. The generated video game missions may be constrained by the mission input parameters but may otherwise be different from one another, e.g., by selecting different templates and/or populating templates with different selected roles of places, opponents, allies, and goals that in turn make use of different digital assets.

Embodiments may score cache performance of the multiple different generated video game missions at least in part by identifying digital assets used by the video game missions, and determining whether the identified digital assets are in a cache. For example, a list of keys may be generated or retrieved to identify digital assets used by a particular generated mission. The list of keys may be compared to a cache table identifying digital assets stored in a cache. A cache score may comprise a cache re-use rate corresponding to a proportion of digital assets for a mission that are already in a cache. Other techniques for generating cache scores may be applied in some embodiments, and may account for factors such as overall size, e.g., in kilobytes (kB) or Megabytes (MB), of combined digital assets for a mission that are already in a cache and/or overall size of combined digital assets for a mission that are not already in a cache.

In some embodiments, scoring cache performance of a video game mission may comprise scoring cache performance of multiple different paths available within the video game mission. For example, a mission may have multiple different options (paths) which a player may elect to take. The player may encounter different digital assets along each of the different paths. Digital assets may be identified for each path, each path may be scored for cache performance, and cache performance scores of the multiple different paths may be combined to determine an overall cache performance score for a mission. Depending on cache contents and digital assets included in a path, some paths may have "good" cache scores indicating high usage of digital assets already in a cache (high cache re-use rates); while other paths may have "bad" cache scores with low cache re-use rates. Mission cache performance scoring may comprise scoring cache performance of multiple different paths for example by scoring the multiple different paths within a single mission and, e.g., dividing by the total number of different paths to get an average cache re-use rate indicator for paths included in the mission. Other embodiments may make other combinations of cache performance scores for different paths in a mission as appropriate to score cache performance of video game missions as a whole.

Embodiments may select a video game mission from among the multiple different video game missions using the cache performance scores of the video game missions. For example, in some embodiments, a video game mission having a best cache performance score, corresponding to a highest re-use rate of digital assets in the cache, may be selected. The selected video game mission may be provided for video game playback.

In some embodiments, cache performance scores may be compared to a threshold cache performance score, and any mission having a cache performance score that meets or exceeds the threshold (e.g. by being above or below the threshold cache performance score, depending on the particular implementation) may qualify for selection, while missions having cache performance scores that do not meet or exceed the threshold may be discarded.

In some embodiments, selecting a video game mission may account for additional factors, in combination with the cache performance scores. For example, embodiments may score diversity of video game missions. Diversity scores may be used in combination with cache performance scores to select video game missions. Diversity may be measured, e.g., by comparing digital assets in a video game mission to digital assets previously encountered by a video game player, e.g., by referring to player history information. In some embodiments, diversity may be measured by comparing digital assets in a video game mission with digital assets used in any video game outputs during a given time interval, e.g., a time interval comprising 5 minutes, 10 minutes, 15 minutes, one hour, or other time interval preceding the diversity measurement.

FIG. 1 is a block diagram illustrating example player terminals interacting with web servers in a datacenter to play a multiplayer video game, arranged in accordance with at least some embodiments of the present disclosure. FIG. 1 includes a player terminal 101, a player terminal 102, a network 180, and a data center 110. Data center 110 includes a web server 111, a web server 112, example databases 121, 122, and 123, and example computing system caches 131, 132, 133.

In FIG. 1, video game players may operate player terminals 101 and 102, which may comprise, for example, home Personal Computer (PC) systems, video gaming consoles such as consoles sold under the XBOX®, PLAYSTATION®, and/or NINTENDO® brands, or mobile devices such as smart phones and tablet devices. Player terminals 101 and 102 may send video game inputs 105 to data center 110, and may receive video game outputs 115 from data center 110, via network 180, such as the Internet. Data center 110 may comprise, e.g., any group of computing devices adapted to support video game applications. In some embodiments, data center 110 may be managed by a video gaming company such as BLIZZARD ENTERTAINMENT®, maker of the popular multiplayer online video game WORLD OF WARCRAFT®, among others. In some embodiments, data center 110 may comprise a data center hosting both video game applications and other applications, e.g., a data center supporting AMAZON WEB SERVICES® or other cloud computing services.

Video game inputs 105 may comprise, e.g., player selections and movement/action information, and video game outputs 115 may comprise, e.g., digital assets such as scenery, sounds, characters, maps, models, vehicles, and the like, as well as other players' movement/action information. Web servers 111 and 112 in data center 110 may support a video game application (not shown in FIG. 1) adapted to process video game inputs 105, retrieve digital assets such as digital asset 135 and digital asset 155, and include digital assets 135 and 155 in video game outputs 115. Web servers 111 and 112 may for example retrieve digital asset 135 from one or more of databases 121, 122, and 123, e.g., via asset request 125. Web servers 111 and 112 may for example retrieve digital asset 155 from one or more of caches 131, 132, and 133, e.g., via asset request 145. Retrieving digital assets from caches 131, 132, and 133 is generally faster and less costly than retrieving digital assets from databases 121, 122, and 123. Therefore, embodiments of this disclosure may be adapted to improve cache re-use rates by increasing inclusion of digital assets such as 155, which are stored in caches 131, 132, and 133, in video game outputs 115.

Figure 2:
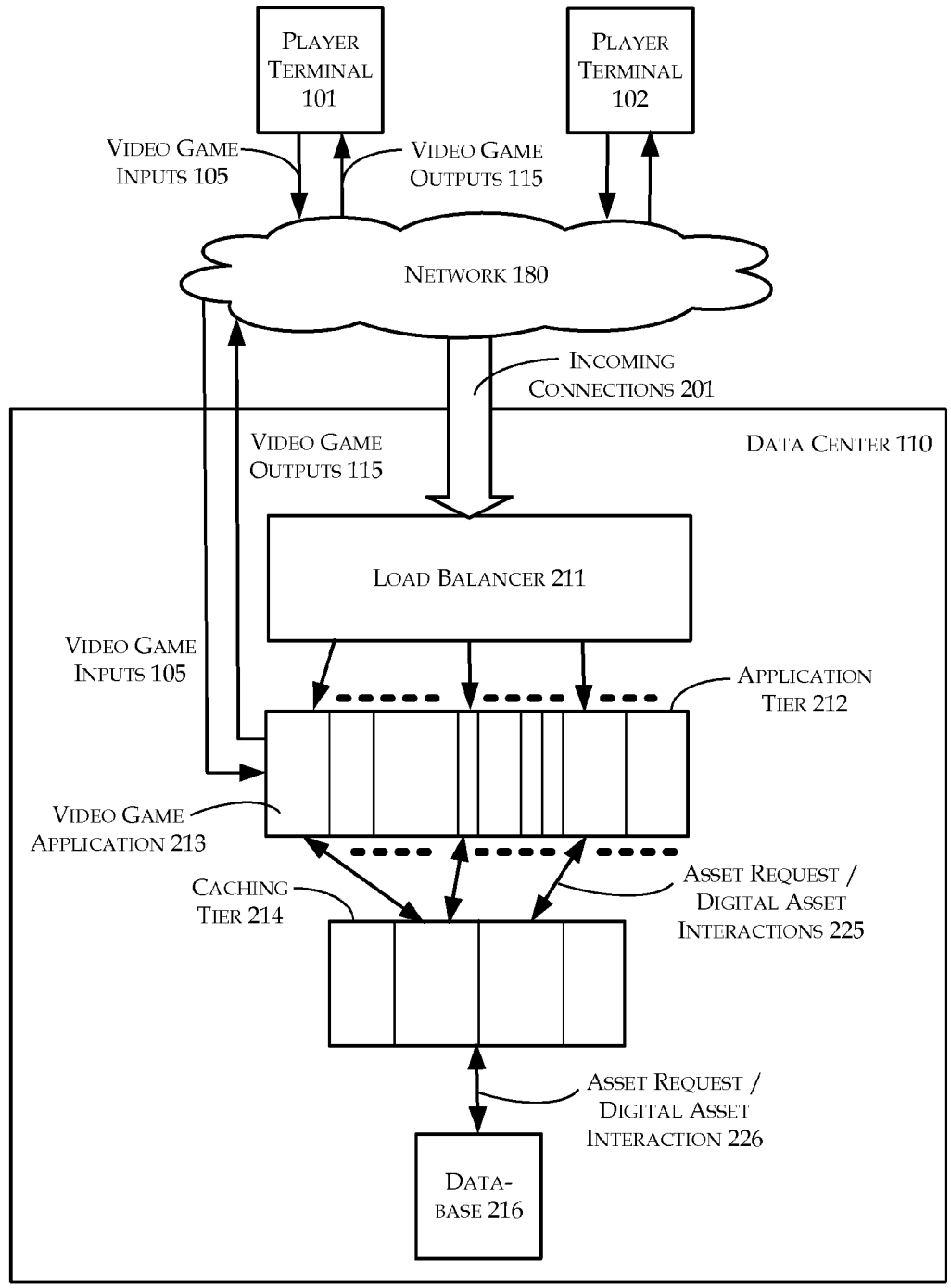
FIG. 2 is a block diagram illustrating example player terminals interacting with a video game application in a datacenter to play a multiplayer video game.

FIG. 2 is a block diagram illustrating example player terminals interacting with a video game application in a datacenter to play a multiplayer video game, arranged in accordance with at least some embodiments of the present disclosure. FIG. 2 provides another view of the architecture and interactions described above in connection with FIG. 1. Similar to FIG. 1, FIG. 2 includes player terminal 101, player terminal 102, network 180, and data center 110. In FIG. 2, illustrated aspects of data center 110 include load balancer 211, application tier 212 including video game application 213, caching tier 214 including block 215, and database 216.

In FIG. 2, incoming connections 201 from player terminals 101 and 102 are assigned to web servers (not shown in FIG. 2) as appropriate by load balancer 211. Web servers may support application tier 212 by hosting applications such as video game application 213. Application 213 may interact with player terminals 101 and 102 by receiving video game inputs 105 and providing video game outputs 115 to player terminals, e.g., to player terminal 101. Applications such as 213 may retrieve digital assets by asset request/digital asset interactions 225, in which digital assets may be requested by application 213 and requested digital assets may be returned to application 213. Asset request/digital asset interactions 225 may for example request digital assets from a memory subsystem comprising caching tier 214 and database 216. If a requested digital asset is present in caching tier 214, the requested digital asset may be returned directly to application 213 from caching tier 214, without an asset request/digital asset interaction 226 with database 216. If a requested digital asset is not present in caching tier 214, an asset request/digital asset interaction 226 with database 216 may be employed to retrieve the requested digital asset from disk or other storage, which digital asset may be returned to application 213. Embodiments of this disclosure may be used with any memory subsystem architecture known in the art or as may be developed.

Caching tier 214 may comprise one or more types and/or levels of cache. Architectures comprising multiple cache levels, referred to as level 1 cache, level 2 cache, level 3 cache, etc. may be used. Some embodiments may employ a caching architecture referred to as memcached (pronounced Mem-Cache-Dee). Objects requested from database or storage systems may be loaded in, and subsequently retrieved from, memcached. Memcached automatically runs in a distributed fashion storing data by key and content in memory for fast access. Some embodiments may employ a caching architecture referred to as elasticache, such as the cache available through AMAZON WEB SERVICES®.

Datacenter architectures may be divided into a number of tiers, as illustrated in FIG. 2, and management of the demand and exchanges between those tiers may comprise part of optimizing datacenter 110 performance. For example, many datacenter architectures may be limited in the speed of their responses by the fetching of data from large storage databases, e.g., database 216. This problem may be addressed by the addition of caching tier 214. The caching tier 214 may store data that is accessed repeatedly, providing both better datacenter 110 performance and reduced database 216 or storage system load. The gains from caching tier 214 are often significant. Not only does caching tier 214 typically return data quickly, speeding up requests that hit caching tier 214, but caching tier 214 reduces database 216 demand and thus also speeds up requests for digital assets that are not in caching tier 214.

Multiplayer online games, and MMOGs in particular, have a number of architectural challenges. One of these is that players expect fast load and response times, but the nature of such video games may include many "random" elements and events, which reduce the leverage available to designers to improve performance with tools like caching tier 214. Therefore video game architectures that allow high performance leverage from caching tier 214 may have a significant effect on performance of video game applications such as 213, especially in embodiments wherein video game application 213 comprises a multiplayer online game or MMOG.

In some embodiments, technologies described herein may modify probabilities of using digital assets such as 3D models, maps, Artificial Intelligence (AI), and/or characters to increase probabilities of reusing digital assets that are present in caching tier 214. Embodiments may survey caching tier 214 and raise probabilities of use for digital assets in caching tier 214 by altering probabilities used to assign missions and/or otherwise generate video game outputs 115, so that video game application 213 is more likely to generate missions and/or other video game outputs 115 that have a larger proportion of cache hits. This compares to existing video game mission generation, selection based or procedural, that does not modify probability of digital asset use based on whether digital assets are in caching tier 214 or not. The benefits of embodiments presented here include better performing video game applications that also cost less to operate, because retrieving digital assets from caching tier 214 is both faster and cheaper than retrieving digital assets from database 216 or other storage.

Many of today's video games have intense graphics and interfaces with many moving parts. Supporting robust graphics on desktop and console platforms is comparatively more feasible than on web servers, due to availability of high-density media such as Digital Versatile Disks (DVDs) and also fast read/write speeds provided by local storage and solid state drives. However, robust graphics often push the limits of even fast local storage. Furthermore, as more video games are created to be played on the web, video game applications are challenged to provide video game players with great gaming experiences while minimizing delays waiting for digital assets to be located and accessed from memory subsystems in data centers and other collections of web servers.

In some embodiments, video game application 213 may comprise a library of mission/quest templates and scripts that may be given to players via various mechanisms like non-player characters (NPCs), "agent" systems, or journals in which the missions appear. Such missions may include instructions that take players to different places in the game world to face challenges, and the missions themselves may be algorithmically generated either by random selection from a library or pseudo-random algorithmic assembly of game components and their associated digital assets. While this has historically been an architectural weakness in terms of taking advantage of cache, because random digital asset needs generally make poor use of caching tiers, it can also be seen as an opportunity because video game players may not have specific expectations (beyond agent or location context) of what mission may occur next, and so probabilities can be manipulated to the advantage of cache-influenced video game architectures as disclosed herein.

In some embodiments, video game application 213 may observe the contents of caching tier 214 to manage missions and digital assets delivered in video game outputs 115 to player terminals 101 and 102, so as to increase the average cache use, thus improving performance of video game application 213. Once digital assets are loaded into caching tier 214 and thus available rapidly and without storage/database calls, video game application 213 may increase the probability of usage for those digital assets, e.g. by increasing the probability of a particular mission being offered, populating a mission with digital assets in caching tier 214, or by keeping missions within the bounds of terrain that is already loaded in caching tier 214. This results in higher performance as more video game application 213 data requests read from the caching tier 214 instead of the storage tier, e.g. instead of database 216, and also lower costs of operating video game application 213 due to fewer overall data requests from the storage tier.

Figure 3:
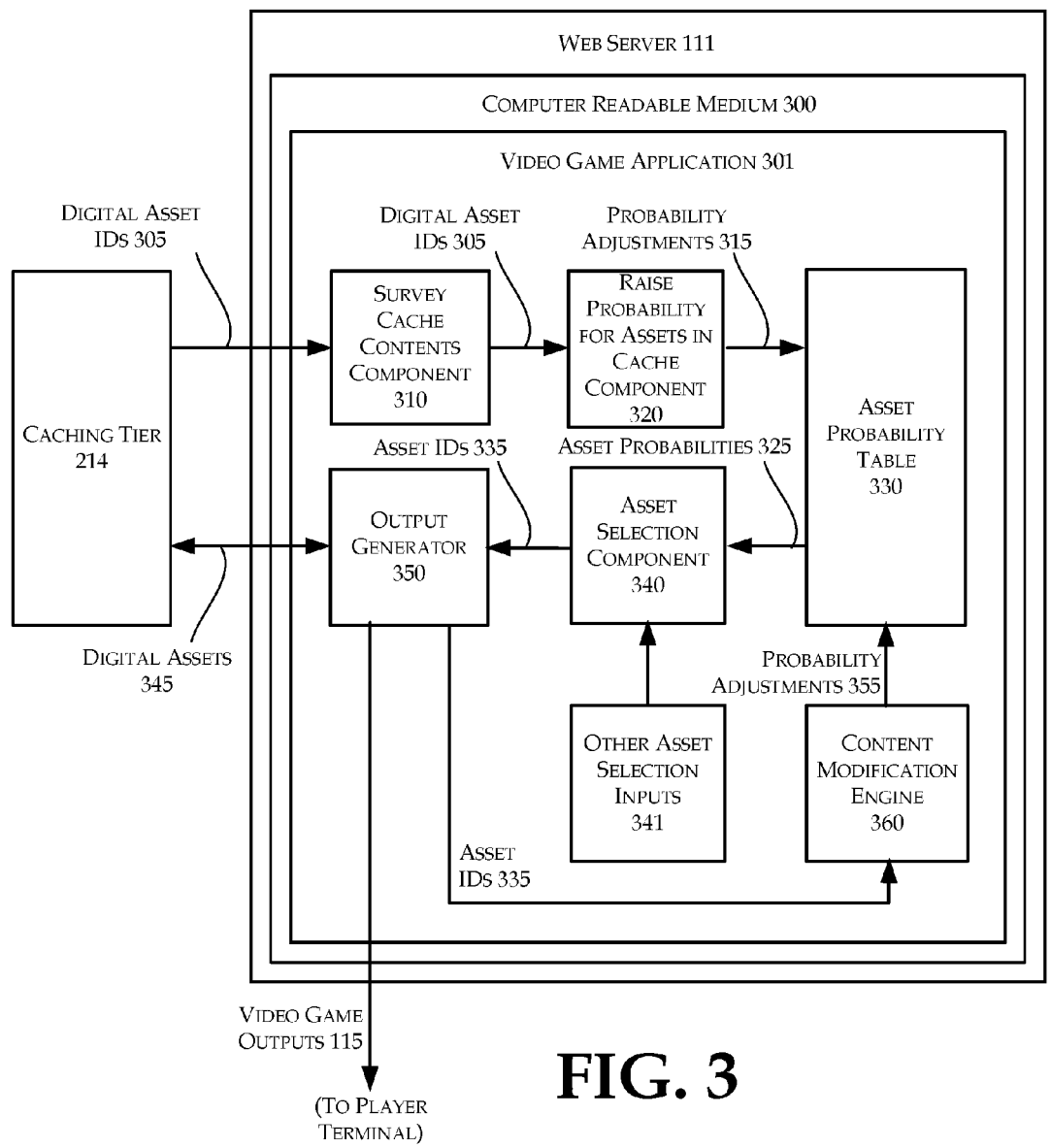
FIG. 3 is a block diagram illustrating an example web server comprising a cache-influenced video game.

FIG. 3 is a block diagram illustrating an example web server comprising a cache-influenced video game, arranged in accordance with at least some embodiments of the present disclosure. FIG. 3 includes example web server 111 and caching tier 214. Web server 111 comprises a computer readable medium 300, and computer readable medium 300 comprises an example video game application 301. Video game application 301 is one example embodiment of video game application 213 in FIG. 2, wherein video game application 301 may generally implement the first technological approach described herein. Video game application 301 comprises a survey cache contents component 310, a raise probability for assets in cache component 320 (hereinafter raise probability component 320), an asset probability table 330, an asset selection component 340, an output generator 350, other asset selection inputs 345, and a content modification engine 360.

In FIG. 3, survey cache contents component 310 may be configured to identify digital asset identifiers (IDs) 305 in caching tier 214, e.g. by retrieving digital asset IDs 305 from caching tier 214. Raise probability component 320 may be adapted to access retrieved digital asset IDs 305, and to make probability adjustments 315 in asset probability table 330, e.g., by adjusting probability values in probability table 330. Asset probability table 330 may comprise digital asset IDs 305, and optionally also digital asset IDs for digital assets not in caching tier 214. In some embodiments, asset probability table 330 may comprise digital asset IDs for all or substantially all digital assets available for use by video game application 301, where the digital asset IDs may be assigned different probability values depending upon their availability in caching tier 214.

Asset selection component 340 may be configured to select digital assets for inclusion in video game outputs. Asset selection component 340 may be configured to use asset probabilities 325 retrieved from asset probability table 330, optionally along with other asset selection inputs 345 to select asset IDs 335. Asset selection component 340 may provide asset IDs 335 to output generator 350. Output generator 350 may generate video game outputs 115 comprising digital assets identified by asset IDs 335 as well as other digital assets and video game content as appropriate. Output generator 350 may retrieve digital assets 345 identified by asset IDs 335 from caching tier 214, and output generator 350 may retrieve any other digital assets from storage, e.g., from a database as illustrated in FIG. 1 and FIG. 2. Video game outputs 115 may be provided for playback, e.g., by sending video game outputs 115 to a player terminal. In some embodiments, asset IDs 335 may also be provided to content modification engine 360. Content modification engine may be configured to make additional probability adjustments 355 within asset probability table 330, e.g., to diversify the digital assets selected for inclusion in video game outputs 115 over time.

In some embodiments, survey cache contents component 310 may be configured to survey cache contents in caching tier 214. Survey cache contents component 310 may directly query caching tier 214, and may optionally also maintain a parallel data structure reflecting relevant contents of caching tier 214. Raise probability component 320 may raise probabilities of occurrence within video game outputs 115 for digital assets that are already in caching tier 214, as identified by digital asset IDs 305, by modifying asset probability table 330. Asset probability table 330 may literally associate probabilities with digital assets, or may change digital assets probabilities by changing probabilities of adventures or components that make use of digital assets. Asset probability table 330 may be used by asset selection component 340 and output generator 350 to generate video game outputs 115, for example by providing asset probabilities 325 for algorithmic mission selection or generation. Video game outputs 115 may be delivered to a player terminal, as shown.

Survey cache contents component 310 and raise probability component 320 can be implemented in a variety of ways. In some embodiments, digital assets in caching tier 214 can be identified, e.g., using a memcache.get against a list of keys. For example, the following code may implement components 310 and 320 in python, assuming there is a list of relevant keys (in string form) called "all_keys", and functions to increase and decrease probability in asset probability table 330 called, respectively, "increase_probability_of_asset" and "decrease_probability_of_asset" when given a key as a parameter:

```
def survey_cache_contents( ):
    for a_key in all_keys
        data = memcache.get(a_key)
        if data is not None:
            increase_probability_of_asset(a_key)
        else:
            decrease_probability_of_asset(a_key)
```

The above code, when called, iterates through all_keys, taking each key and checking to see if it is in caching tier 214, and then appropriately adjusting corresponding asset probability up or down in asset probability table 330. The advantage of such embodiments is robustness as querying the caching tier 214 is a robust way to know the contents of caching tier 214; the disadvantage is that such surveys load the cache to some degree, although it may be kept to a small degree by updating the survey only occasionally.

In some embodiments, survey cache contents component 310 may be adapted to conduct an initial cache survey, e.g., at the time of cache population. Each memcache.add command may then be paired with the addition of a record of the added key to a dict variable (a dictionary variable that provides a fast hash lookup structure for linked tuples). Such embodiments have the advantage that identification of digital assets in caching tier 214 need not load the cache. Dict variables may be maintained with information on time-to-live in the cache and appropriate removal of items that are expiring in the cache. In some embodiments, hybrid versions may combine cache surveys which load the cache with the use of updated tracking variables to lengthen the time between surveys.

In some embodiments, asset selection component 340 and/or output generator 350 may be configured within and/or in cooperation with a "story engine" in video game application 301. The story engine may take various variables into account to algorithmically generate ongoing missions. Story engines may accept variables that influence mission or quest generation. Such variables may include, for example, faction and standing of players, player skills and specialties, and even historical aspects like which non-player characters a player may have interacted. In some embodiments, story engines may be modified to accommodate the techniques described herein, e.g., to accept asset probabilities 325 from asset probability table 330, wherein asset probabilities 325 are effective to adjust generated missions to make better use of caching tier 214. For example, if models and AI for particular monsters are already in caching tier 214, then encounters with such models and AI can be made more common by the use of asset probabilities 325. If a particular region is well represented in caching tier 214, for example, missions may be preferentially directed toward or through that region.

In some embodiments, video game outputs 115 may include digital assets loaded in caching tier 214 prior to asset selection by asset selection component 340, such as digital assets identified by digital asset IDs 305, and also other digital assets which may be loaded into caching tier 214 after asset selection, e.g., for the purpose of generating all aspects of video game outputs 115. Generation and delivery of video game outputs 115 may therefore result in alterations to caching tier 214, e.g., as video game players roam outside cached regions, adventure scripts dictate changes, or random content generation does not align with digital assets already in caching tier 214. Such alterations may modify cache contents over time, resulting in eventual identification of different digital asset IDs as digital asset IDs 305 through continued operation of survey cache contents component 310.

The presence of newly loaded digital assets in caching tier 214 may affect digital asset IDs subsequently retrieved by survey cache contents component 310, thereby shifting the probabilities in asset probability table 330 and optionally leading to gradual turnover of digital assets selected by asset selection component 340. In some embodiments, content modification engine 360 may be adapted to adjust probabilities in asset probability table 330 to promote and/or guarantee such cache turnover of digital assets in caching tier 214. Content modification engine 360 may for example explicitly alter asset probabilities over time to ensure a minimum diversity of digital assets included in video game outputs 115, or to provide digital assets matched to changing player audiences over time.

Regarding content modification engine 360 in general, one possible side effect of increasing cache re-use rates, applicable in some scenarios, is that video game application 301 may re-circulate video game players into smaller areas and engage video game players in an overall smaller selection of digital assets due to the increased probability of using missions and digital assets that select from a finite caching tier. Large caches and large player and mission populations may produce enough new cache tier content to generate a virtuous cycle of changing cache content, however there is also a danger that, in some embodiments, increased probability of use of content in caching tiers may lead to over-use of limited content in a manner that degrades player satisfaction. Thus embodiments may control content diversity in combination with increasing cache re-use rates. It will be appreciated, with the benefit of this disclosure, that a variety of technical approaches for controlling content diversity may be used. Content modification engine 360 illustrates an example approach.

In some embodiments, content modification engine 360 may enhance content diversity by adjusting values in probability table 330 to influence asset selection 340. For example, content modification engine 360 may periodically adjust probability values associated with a fraction of the low probability value digital assets in probability table 330 to instead have high probability values. Such adjustments may result in a chain reaction leading to increased use of such newly high probability value digital assets. For example, such high probability value digital assets may be selected by asset selection 340, loaded in caching tier 214 for use by output generator 350, identified by survey cache contents component 210 among digital asset IDs 305, and assigned higher probability values in asset probability table 330 by raise probability component 320.

Content modification engine 360 may adjust probability values of any fraction of digital assets in probability table 330, at any frequency. In some embodiments, content modification engine 360 may make adjustments adaptively to reach a targeted rate of change in contents of caching tier 214, digital asset IDs 305, and/or asset IDs 335 over time. By targeting a rate of change over time, content modification engine 360 may use a metric that refreshes cache content and applies across many different player populations. For example, a rate of change of 5% per ten minutes would, on average, swap out cache content about every two hours. Content modification engine 360 may target any rate of cache change, e.g., from 1% to 99% per time interval, which interval may be, e.g., per minute, multiple minute, hour or multiple hour period.

Content modification engine 360 may make adjustments adaptively to reach a targeted rate of change, e.g., by measuring a rate of change in caching tier 214, digital asset IDs 305, and/or asset IDs 335, and selecting a number of digital assets for probability value adjustment based on the measured rate of change. When the measured rate of change is at or above a targeted rate of change, e.g., at or above 5% per ten minutes, the content modification engine 360 may take no action as the targeted rate of change is already occurring naturally. When the measured rate of change is below the targeted rate of change, e.g., below 5% per ten minutes, the content modification engine 360 may select a number of digital assets for probability value adjustment, which selected number may grow with the difference between the measured and targeted rate of change.

In some embodiments, content diversity may be promoted, e.g., by operation of asset selection component 340. Operations of asset selection component 340 may be combined with, or independent of, operations of content modification engine 360. In some embodiments, asset selection module 340 may for example employ "unmodified" mission selection/digital asset selection for a fraction of missions/digital asset selections. Unmodified selection may not account for probability values in asset probability table 330, thereby effecting a controlled increase in the number digital assets in video game outputs 115 that are not in caching tier 214.

In some embodiments, asset selection module 340 may be configured to keep and/or access records of missions and/or digital assets encountered by each player, and asset selection module 340 may select content that players have not encountered, or have not "recently" encountered, as determined through the use of any desired time interval, even though when asset selection results in selection of digital assets with worse cache performance scores. Such embodiments may engage in selecting digital assets from outside of caching tier 214, and subsequent loading of selected digital assets in caching tier 214, when the retrieval/loading of new digital assets in caching tier 214 may be most effective from a player experience standpoint, while still refreshing the caching tier 214 over time.

Figure 4:
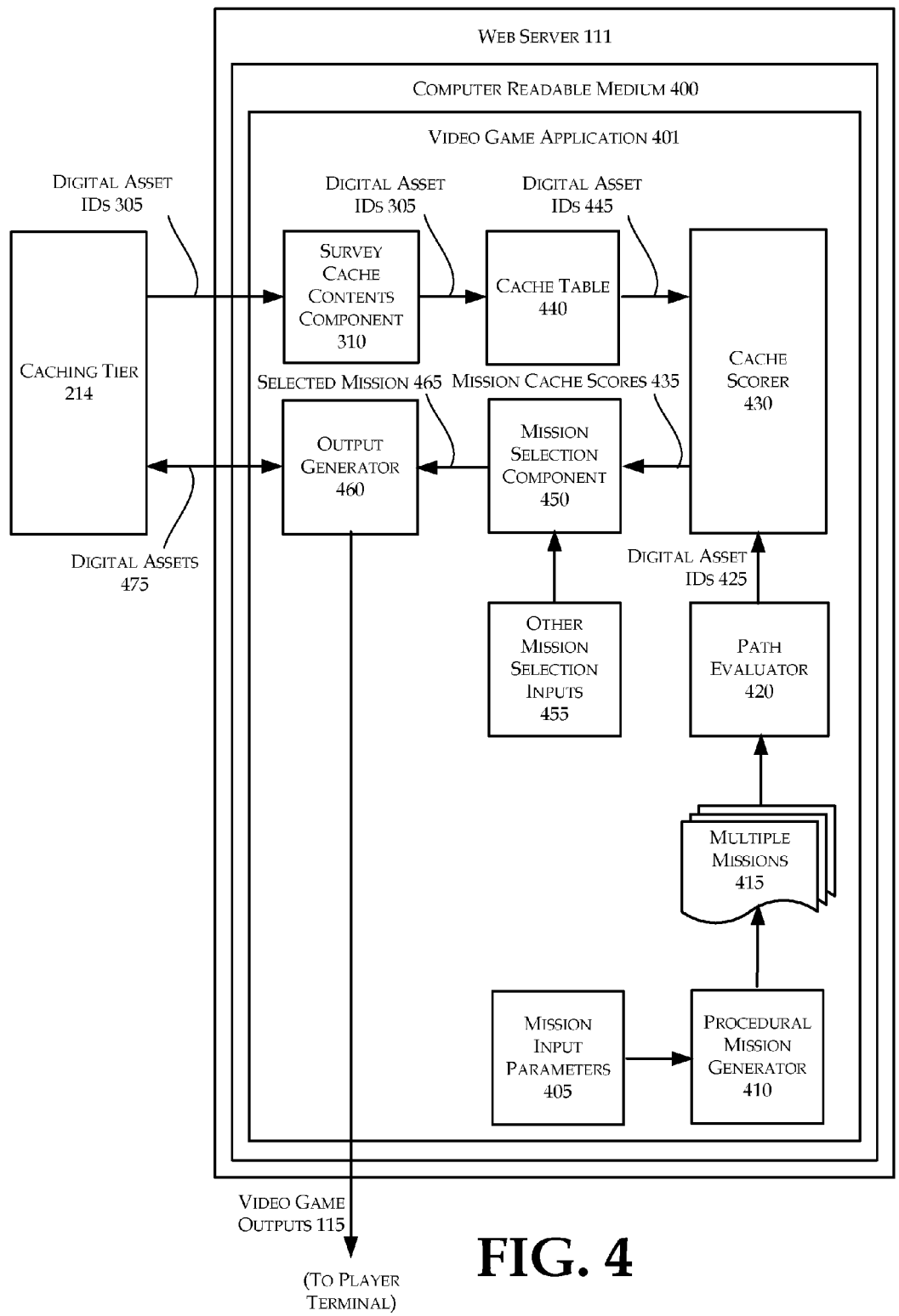
FIG. 4 is a block diagram illustrating an example web server comprising a cache-influenced video game.

FIG. 4 is a block diagram illustrating an example web server comprising a cache-influenced video game, arranged in accordance with at least some embodiments of the present disclosure. FIG. 4 includes example web server 111 and caching tier 214. Web server 111 comprises a computer readable medium 400, and computer readable medium 400 comprises an example video game application 401. Video game application 401 is another example embodiment of video game application 213 in FIG. 2, wherein video game application 401 may generally implement the second technological approach described herein. Video game application 401 comprises mission input parameters 405, a procedural mission generator 410, multiple missions 415, a path evaluator 420, and a cache scorer 430. Video game application 401 also comprises survey cache contents component 310 and a cache table 440. Video game application 401 also comprises a mission selection component 450 and an output generator 460.

In FIG. 4, survey cache contents component 310 may be configured to retrieve digital asset identifiers (IDs) 305 from caching tier 214, as described with reference to FIG. 3. Retrieved digital asset IDs 305 may be placed in cache table 440. In some embodiments, digital asset IDs other than digital asset IDs 305 may be removed from cache table 440. In some embodiments, cache table 440 may comprise, e.g., IDs for all digital assets available for use by video game application 401, with data indicating which digital assets in cache table 440 are present in caching tier 214. In some embodiments, cache table 440 may be implemented similarly to asset probability table 330, described with reference to FIG. 3.

Video game application 401 may generate mission input parameters, e.g., in response to a received video game input requesting a new mission. Video game application 401 may submit mission input parameters 405 to procedural mission generator 410. In some embodiments, video game application 401 may be adapted to submit mission input parameters 405 multiple times, to cause procedural mission generator 410 to generate multiple missions 415. In some embodiments, procedural mission generator 410 may be adapted to automatically generate multiple missions 415 in response to a mission request comprising mission input parameters 405.

In some embodiments, procedural mission generator 410 may be configured to operate at least in part according to a fill-in-the-blanks model. Procedural mission generator 410 may for example pick a template that has roles to be filled for opponents, allies, and locations, and may select digital assets to fill those roles based on specific qualities. For example, a template selector may pick a template such as, "Player will navigate to <2 places>, face <2 opponents>, work with <1 ally> and achieve <1 goal>", where each of the roles of places, opponents, allies, and goals may have labels and/or levels of difficulty associated with them. Procedural mission generator 410 may query a database with the properties of each of the places, opponents, allies, goals, etc. to fill in the details. Since generating procedural missions may comprise a lightweight activity including a few database calls, solutions may provide effective processes by generating multiple differently populated procedural scenarios, i.e., multiple missions 415, and evaluating each one, including conducting path evaluation as appropriate to account for different paths or locations that may be traversed and/or visited during a mission.

In some embodiments, each of multiple missions 415 may be processed by path evaluator 420. Path evaluator 420 may be configured to identify digital assets used in each of multiple missions 415. Path evaluator 420 may be "path blind" by identifying digital assets regardless of their use in different paths within a mission, or "path aware" by identifying digital assets within a mission on a per-path basis. In some embodiments, path evaluator 420 may be configured to estimate a path, e.g., from among multiple path options in a mission, and to identify digital assets used in the estimated path.

Digital asset IDs 425 for each of multiple missions 415 may be submitted to cache scorer 430. In "path aware" embodiments, digital asset IDs 425 may be accompanied by path information. Cache scorer 430 may score each of multiple missions 415, and may optionally score different paths within a mission, by determining a cache re-use rate for each mission. There are a wide variety of approaches that may be used to determine cache re-use rates, and this disclosure is not limited to any particular approach. In general, approaches for determining cache re-use rates may determine which of digital asset IDs 425 overlap with digital asset IDs 305. In other words, approaches for determining cache re-use rates may determine which of digital asset IDs 425 are present in caching tier 214. Digital asset IDs 445 may therefore comprise, e.g., the digital asset IDs that are present in both of digital asset IDs 425 and digital asset IDs 305. In some embodiments, the number of IDs present in digital asset IDs 445, the proportion of digital asset IDs 445 to digital asset IDs 425, the combined size of digital assets represented by digital asset IDs 445, and/or any other metric may be generated by cache scorer 430 as a cache score to assess cache re-use rates of each of the multiple missions 415. In some embodiments, e.g., when cache scores for multiple missions 415 are not acceptable, cache scorer 430 may be adapted to re-initiate procedural mission generator 410 to generate further missions using mission input parameters 405, which further missions may be scored as described above.

In some embodiments, cache scorer 430 may provide mission cache scores 435 to mission selection component 450. Mission selection component 450 may be adapted to use mission cache scores 435, optionally along with other mission selection inputs 455, to identify a selected mission 465. Mission selection component 450 may provide a selected mission 465 to output generator 460. Output generator 460 may retrieve digital assets 475 from caching tier 214, and may also retrieve other digital assets from other storage, to generate video game outputs 115 comprising selected mission 465.

Figure 5:
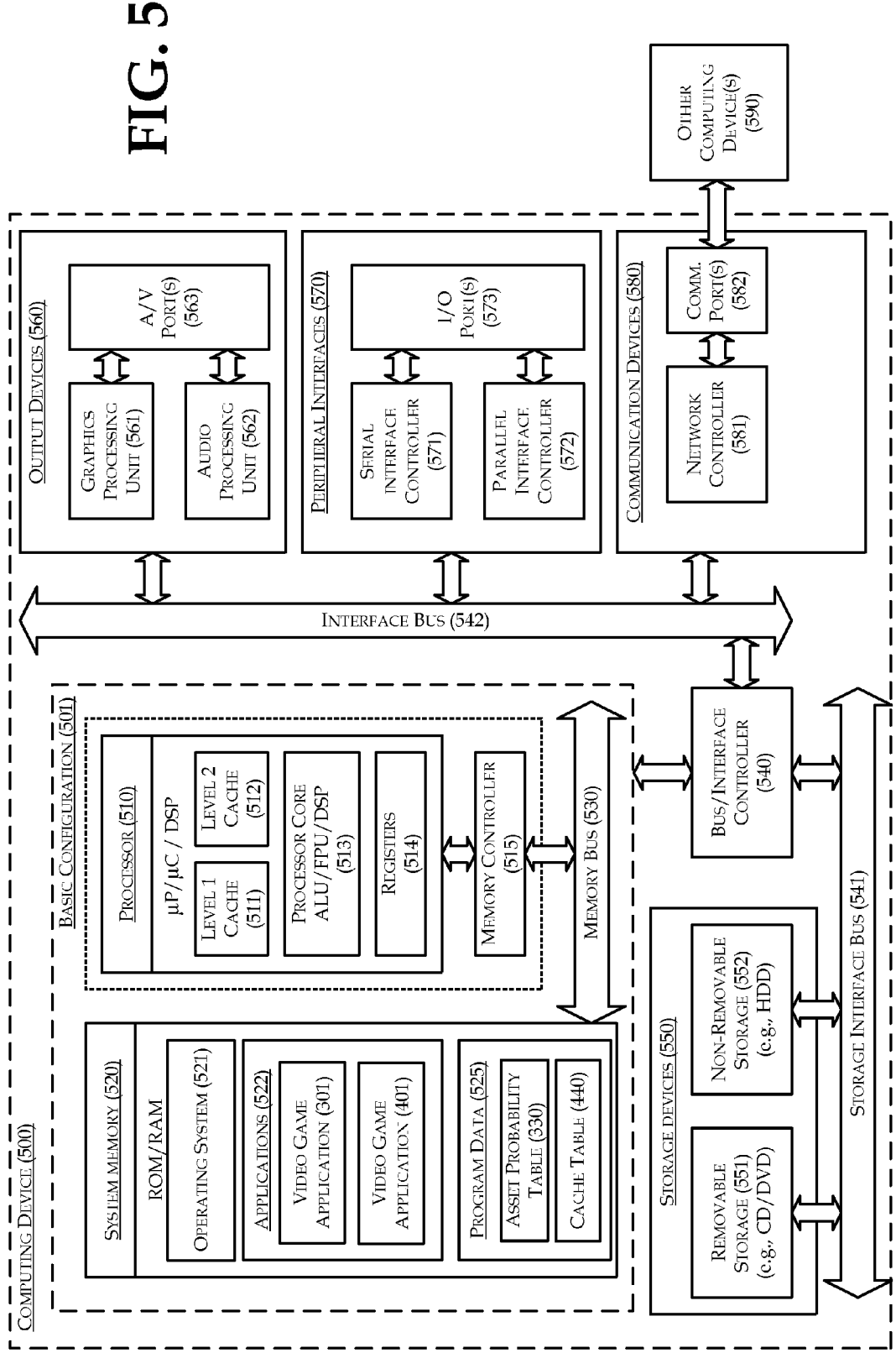
FIG. 5 is a block diagram of a computing device as one example of a computing system configured to provide a cache-influenced video game.

FIG. 5 is a block diagram of a computing device 500 as one example of a computing system configured to provide a cache-influenced video game, arranged in accordance with at least some embodiments of the present disclosure. In a very basic configuration 501, computing device 500 may include one or more processors 510 and system memory 520. A memory bus 530 may be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.), or any combination thereof. System memory 520 typically includes an operating system 521, one or more applications 522, and program data 525. In some embodiments, operating system 521 may comprise a virtual machine that is managed by a Virtual Machine Manager (VMM). Applications 522 may include, for example, video game application 301 and/or video game application 401. Program data 525 may include asset probability table 330, cache table 440, and/or any other data that may be used by applications 301 and 401, respectively.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 511, level 2 cache 512, system memory 520, removable storage devices 551, and non-removable storage devices 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 500. Any such computer storage media may be part of computing device 500.

Computing device 500 may also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which may be configured to communicate to various external devices such as a display or speakers via one or more A/V ports 563. Example peripheral interfaces 570 may include a serial interface controller 571 or a parallel interface controller 572, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 573. Other conventional I/O devices may be connected as well such as a mouse, keyboard, and so forth. An example communications device 580 includes a network controller 581, which may be arranged to facilitate communications with one or more other computing devices 590 over a network communication via one or more communication ports 582.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 500 may be implemented as a web server in a data center or otherwise supporting a multiplayer online video game. Computing device 500 may also be implemented as a PC, smart phone, or tablet type device equipped with a local video game application, implemented as a personal or business use computer including both laptop computer and non-laptop computer configurations.

Figure 6:
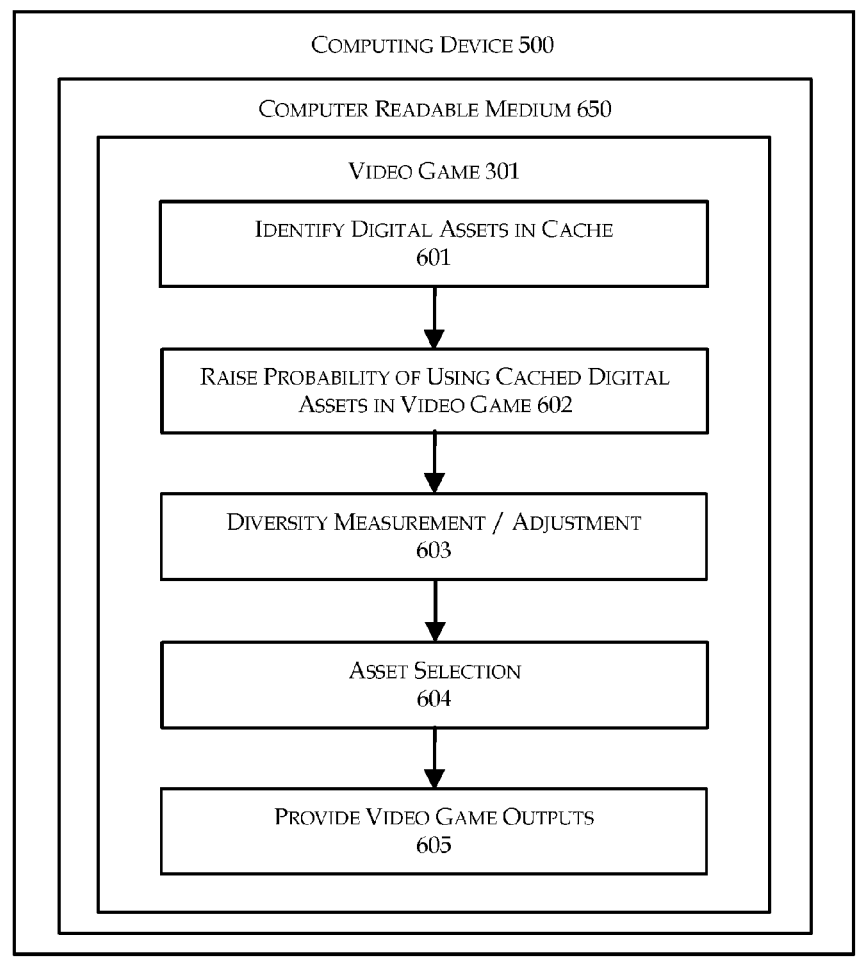
FIG. 6 is a flow diagram illustrating example methods for providing a cache-influenced video game.

FIG. 6 is a flow diagram illustrating example methods for providing a cache-influenced video game, arranged in accordance with at least some embodiments of the present disclosure. The example flow diagram may include one or more operations/modules of video game 301 as illustrated by blocks 601-605, which represent operations as may be performed in a method, functional modules in a computing device 500, and/or instructions as may be recorded on a computer readable medium 650.

In FIG. 6, blocks 601-605 are illustrated as including blocks being performed sequentially, e.g., with block 601 being performed first and block 605 performed last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 6 illustrates an example method by which computing device 500 may provide a cache-influenced video game 301 adapted to increase a re-use rate of digital assets in a computing system cache by raising probabilities of using, within video game 301, digital assets in a cache relative to probabilities of using digital assets not in the cache. For example, using methods according to FIG. 6, an audiovisual digital asset, such as a character, may be more likely to appear during play of video game 301 when the digital asset is cached versus when the digital asset is not cached.

As described herein, in some embodiments computing device 500 may comprise a computing system including web servers, and the computing system may be adapted to access a computing system cache comprising a caching tier accessible by the web servers. Video game 301 may comprise a multiplayer online game, and digital assets cached by video game 301 may comprise models, characters, maps, missions, buildings, scenery, vehicles, weapons, short movie segments, and/or other digital, audiovisual digital assets. Computing device 500 and video game 301 may also be arranged as other than a web server in some embodiments, for example, computing device 500 and video game 301 may comprise a standalone computing device and a single-player video game.

At an "Identify Digital Assets in Cache" block 601, computing device 500 may identify one or more digital assets in a cache, e.g., in a caching tier accessible by web servers. Digital assets in the caching tier may be loaded in the caching tier for use during play of a multiplayer online game, e.g., for use in providing the digital assets to any of the multiple players of a multiplayer online game. Any of a variety of approaches may be used to identify digital assets in a cache. For example, in some embodiments, block 601 may comprise querying the cache to retrieve keys corresponding to digital assets in the cache. In some embodiments, block 601 may comprise maintaining a data structure identifying digital assets in the cache by updating the data structure when digital assets are loaded in the cache. Block 601 may be followed by block 602.

At a "Raise Probability of Using Cached Digital Assets in Video Game" block 602, computing device 500 may adjust relative probabilities of using digital assets within video game 301, that is, within video game outputs provided to video game players. Probabilities of using digital assets may be adjusted by raising probabilities associated with digital assets in the cache relative to digital assets not in the cache. Any approach for adjusting probabilities may be used, and different approaches may be tailored to have any desired impact on digital asset selection, e.g., ranging from a relatively small effect, with minimal difference between a cache-influenced video game and a non-cache-influenced video game, to a relatively large effect, with significant differences between a cache-influenced video game and a non-cache-influenced video game. Example approaches for adjusting relative probabilities of digital assets may comprise maintaining an asset probability table identifying digital assets, adjusting relative probabilities in the asset probability table. Block 602 may be followed by block 603.

At a "Diversity Measurement/Adjustment" block 603, computing device 500 may additionally adjust relative probabilities of digital assets by raising probabilities associated with one or more digital assets relative to other digital assets to diversify digital assets selected to include in video game outputs. Again, any approach for adjusting probabilities may be used, and different approaches may be tailored to have any desired impact on digital asset selection. Embodiments may diversify digital assets for example by tracking digital assets provided to each video game player, and diversifying on a per-player basis, and/or to target a rate of cache turnover, as described herein. Block 603 may be followed by block 604.

At an "Asset Selection" block 604, computing device 500 may select digital assets to include in video game outputs using the adjusted relative probabilities of digital assets established by operation of block 602, optionally in combination with adjustments made at block 603. Block 604 may thereby select digital assets in a manner effective to increase a re-use rate of digital assets in the cache. Asset selection at block 604 may also account for additional variables such as player history, player standing, and player skill. Embodiments may employ any level of cache-influence and it is expected that different video games will establish different approaches for incorporating when and to what extent cache-influenced asset selection is appropriate. Block 604 may be followed by block 605.

At a "Provide Video Game Outputs" block 605, computing device 500 may provide video game outputs including selected digital assets for video game playback. For example, computing device 500 may stream video game outputs to a player terminal via a network. In some embodiments, e.g., when computing device 500 is a standalone device, computing device 500 may provide video game outputs by displaying the outputs on a display coupled with computing device 500.

Figure 7:
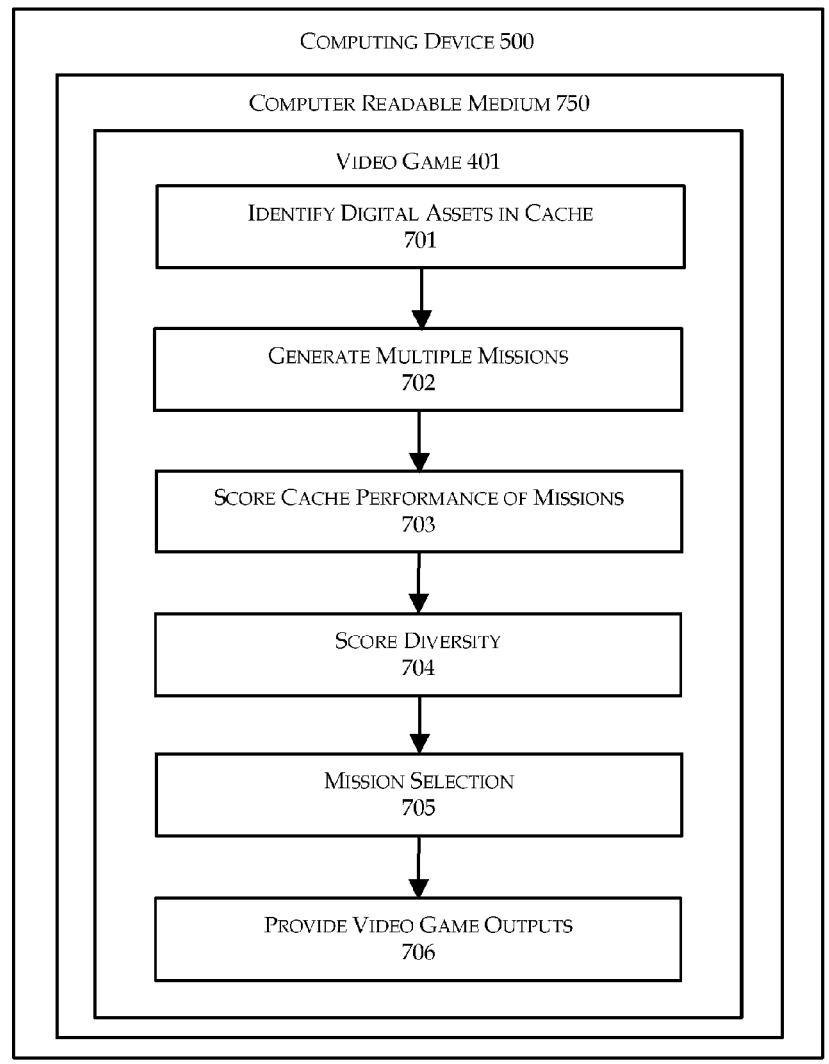
FIG. 7 is a flow diagram illustrating example methods for providing a cache-influenced video game, all arranged in accordance with at least some embodiments of the present disclosure.

FIG. 7 is a flow diagram illustrating example methods for providing a cache-influenced video game, arranged in accordance with at least some embodiments of the present disclosure. The example flow diagram may include one or more operations/modules for video game 401 as illustrated by blocks 701-706, which represent operations as may be performed in a method, functional modules in a computing device 500, and/or instructions as may be recorded on a computer readable medium 750.

In FIG. 7, blocks 701-706 are illustrated as including blocks being performed sequentially, e.g., with block 701 being performed first and block 706 performed last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 7 illustrates an example method by which computing device 500 may provide cache-influenced video game 401, e.g., through performing a cache-influenced video game mission selection process to select a video game mission. Methods according to FIG. 7 may select missions that make more use of digital assets, such as characters, buildings, scenery, etc., that are stored in a computing system cache than other missions that make less use of digital assets stored in the cache.

As described above with reference to FIG. 6, in some embodiments computing device 500 may comprise a computing system including web servers, and the computing system may be adapted to access a computing system cache comprising a caching tier accessible by the web servers. In FIG. 7, video game 401 may comprise a multiplayer online game, and digital assets cached by video game 401 may comprise models, characters, maps, missions, buildings, scenery, vehicles, weapons, short movie segments, and/or other digital, audiovisual digital assets. Computing device 500 and video game 401 may also be arranged as other than a web server in some embodiments, for example, computing device 500 and video game 401 may comprise a standalone computing device and a single-player video game.

At an "Identify Digital Assets in Cache" block 701, computing device 500 may identify one or more digital assets in a cache, e.g., in a caching tier accessible by web servers, as described above with reference to block 601 in FIG. 6. Furthermore, computing device 500 may maintain a cache table comprising IDs for currently cached digital assets. Block 701 may be performed in a manner to continuously, periodically, or otherwise repeatedly update the cache table over time, so that the cache table remains substantially current. The cache table may be useful for example in scoring mission cache performance, described below with reference to block 703. Block 701 may be followed by block 702.

At a "Generate Multiple Missions" block 702, computing device 500 may use a set of mission input parameters to generate multiple different video game missions. In some embodiments, block 702 may comprise submitting multiple mission requests to a procedural mission generator in video game 401. In some embodiments, each of the multiple mission requests may comprise a same set of mission input parameters. Also, the broader goal of generating multiple missions and selecting a mission based on cache performance may be met in some embodiments without necessarily using a same set of mission input parameters. For example, some embodiments may use modified mission input parameters for generating the multiple different video game missions. Block 702 may be followed by block 703.

At a "Score Cache Performance of Missions" block 703, computing device 500 may score cache performance of the multiple different video game missions generated at block 702. Scoring cache performance at block 703 may be accomplished according to a wide variety of different techniques. Scoring may comprise, at least in part, identifying digital assets used by the video game missions, and determining whether the identified digital assets are in a cache. For example, a retrieved or generated list of digital assets included in a mission may be compared against a cache table maintained at block 701, to determine whether the listed digital assets are in the cache. Some embodiments may account for factors such as overall number, percentage, or combined size of digital assets are in the cache. Some embodiments may account for type of cache, e.g., levels of cache in which digital assets are loaded. Some embodiments may score cache performance of multiple different paths available within the video game missions, or calculate a most common or most likely path, and score the calculated path. Block 703 may be followed by block 704.

At a "Score Diversity" block 704, computing device 500 may score diversity of the multiple different video game missions generated at block 702. For example, in some embodiments, computing device 500 may compare digital assets in missions against a player history list identifying digital assets previously encountered by a video game player. Here, a low number of matches would indicate a higher diversity score (higher diversity); while a high number of matches would indicate lower diversity. In another example, computing device 500 may assign each digital asset in a mission a diversity variable such as an amount of time since the digital asset was previously included in a video game output, and diversity variables may be summed, or otherwise combined, for missions to calculate a diversity scores for the missions. Diversity scores may optionally be used in addition to cache performance scores during mission selection at block 705. Block 704 may be followed by block 705.

At a "Mission Selection" block 705, computing device 500 may select a video game mission from among the multiple different video game missions generated at block 702. Mission selection may use, inter alia, cache performance scores generated at block 703, for the video game missions generated at block 702, to select the video game mission. By selecting missions using cache performance scores, video game 401 may increase a re-use rate of digital assets in the cache.

Cache performance scores may be used for mission selection in a variety of different ways. In some embodiments, cache performance scores may be compared to a threshold cache performance score. For example, any cache performance score showing a threshold re-use rate, or better, may be considered an acceptable candidate for selection. In the absence of any missions having threshold re-use rates or better, embodiments may be adapted to return to block 702 to generate additional missions for scoring. In some embodiments, cache performance scores for the multiple generated missions from block 702 may be compared against each other, and a mission having a "best" the cache performance score (e.g. highest re-use rate) may be selected.

Embodiments may also use diversity scores in mission selection at block 705. For example, some embodiments may identify a set of missions having at least a threshold cache performance score, as described above, and then select a mission within the identified set having a highest (or most diverse) diversity score. Some embodiments may combine cache performance and diversity scoring, and select a mission having a best overall combined score. Block 705 may be followed by block 706.

At a "Provide Video Game Outputs" block 706, computing device 500 may provide a selected video game mission for video game playback. For example, computing device 500 may stream video game outputs comprising a selected mission to a player terminal via a network. In some embodiments, e.g., when computing device 500 is a standalone device, computing device 500 may provide video game outputs by displaying the outputs on a display coupled with computing device 500.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method to provide, by a computing system, a cache-influenced video game adapted to increase a re-use rate of one or more digital assets in a computing system cache by raising probabilities of using, within the cache-influenced video game, the one or more digital assets in the computing system cache relative to digital assets not in the computing system cache, the method comprising:
   identifying, by the computing system, the one or more digital assets in the computing system cache;
   adjusting, by the computing system, relative probabilities of using the one or more digital assets within the cache-influenced video game, by raising probabilities associated with the one or more digital assets in the computing system cache relative to digital assets not in the computing system cache;
   selecting, by the computing system, digital assets to include in cache-influenced video game outputs, wherein selecting digital assets to include in cache-influenced video game outputs uses adjusted relative probabilities of using the one or more digital assets, to thereby increase a re-use rate of the one or more digital assets in the computing system cache; and
   providing, by the computing system, the cache-influenced video game outputs for cache-influenced video game playback, the cache-influenced video game outputs including digital assets selected using the adjusted relative probabilities of using the one or more digital assets.

2. The method of claim 1, wherein the one or more digital assets comprise one or more of a model, a character, a map, or a mission.

3. The method of claim 2, wherein the cache-influenced video game comprises a multiplayer online game.

4. The method of claim 3, wherein the computing system comprises one or more web servers, and wherein the computing system cache comprises a caching tier accessible by the one or more web servers.

5. The method of claim 4, wherein the one or more digital assets in the caching tier are loaded in the caching tier for use during play of the multiplayer online game.

6. The method of claim 1, wherein identifying the one or more digital assets in the computing system cache comprises querying the computing system cache to retrieve keys corresponding to the one or more digital assets in the computing system cache.

7. The method of claim 6, further comprising maintaining a data structure identifying the one or more digital assets in the computing system cache by updating the data structure when the one or more digital assets are loaded in the computing system cache.

8. The method of claim 1, further comprising additionally adjusting relative probabilities of using digital assets within the cache-influenced video game by raising probabilities associated with some digital assets relative to other digital assets to diversify digital assets selected to include in the cache-influenced video game outputs.

9. The method of claim 1, wherein adjusting the relative probabilities of using the one or more digital assets within the cache-influenced video game comprises maintaining an asset probability table identifying digital assets, including the one or more digital assets, and the adjusted relative probabilities of using the one or more digital assets.

10. The method of claim 1, wherein selecting the digital assets to include in the cache-influenced video game outputs uses the adjusted relative probabilities of using the one or more digital assets in combination with one or more additional variables selected from the group comprising player history, player standing, and player skill.

11. A non-transitory computer readable storage medium having computer executable instructions executable by a processor, the instructions that, when executed by the processor, implement a cache-influenced video game adapted to increase a re-use rate of one or more digital assets in a computing system cache by raising probabilities of using, within the cache-influenced video game, the one or more digital assets in the computing system cache relative to digital assets not in the computing system cache, wherein the cache-influenced video game causes the processor to:
   identify the one or more digital assets in the computing system cache;
   adjust relative probabilities of using the one or more digital assets within the cache-influenced video game, by raising probabilities associated with the one or more digital assets in the computing system cache relative to digital assets not in the computing system cache;
   select digital assets to include in cache-influenced video game outputs, wherein selecting digital assets to include in cache-influenced video game outputs uses adjusted relative probabilities of using the one or more digital assets, to thereby increase a re-use rate of the one or more digital assets in the computing system cache; and
   provide the cache-influenced video game outputs for cache-influenced video game playback, the cache-influenced video game outputs including digital assets selected using the adjusted relative probabilities of using the one or more digital assets.

12. A computing system configured to provide a cache-influenced video game adapted to increase a re-use rate of one or more digital assets in a computing system cache by raising probabilities of using, within the cache-influenced video game, the one or more digital assets in the computing system cache relative to digital assets not in the computing system cache, comprising:
   a processor;
   a memory; and
   a cache-influenced video game stored in the memory and executable by the processor, wherein the cache-influenced video game is configured to:

identify the one or more digital assets in the computing system cache;

adjust relative probabilities of using the one or more digital assets within the cache-influenced video game, by raising probabilities associated with the one or more digital assets in the computing system cache relative to digital assets not in the computing system cache;

select digital assets to include in cache-influenced video game outputs, wherein selecting digital assets to include in cache-influenced video game outputs uses adjusted relative probabilities of using the one or more digital assets, to thereby increase a re-use rate of the one or more digital assets in the computing system cache; and provide the cache-influenced video game outputs for cache-influenced video game playback, the cache-influenced video game outputs including digital assets selected using the adjusted relative probabilities of using the one or more digital assets.

13. The computing system of claim 12, wherein the one or more digital assets comprise one or more of a model, a character, a map, or a mission.

14. The computing system of claim 13, wherein the cache-influenced video game comprises a multiplayer online game.

15. The computing system of claim 14, wherein the computing system comprises one or more web servers, and wherein the computing system cache comprises a caching tier accessible by the one or more web servers.

16. The computing system of claim 15, wherein the one or more digital assets in the caching tier are loaded in the caching tier for use during play of the multiplayer online game.

17. The computing system of claim 12, wherein identifying the one or more digital assets in the computing system cache comprises querying the computing system cache to retrieve keys corresponding to the one or more digital assets in the computing system cache.

18. The computing system of claim 17, wherein the cache-influenced video game is configured to maintain a data structure identifying the one or more digital assets in the computing system cache by updating the data structure when the one or more digital assets are loaded in the computing system cache.

19. The computing system of claim 12, wherein the cache-influenced video game is configured to additionally adjust relative probabilities of using digital assets within the cache-influenced video game by raising probabilities associated with some digital assets relative to other digital assets to diversify digital assets selected to include in the cache-influenced video game outputs.

20. The computing system of claim 12, wherein adjusting the relative probabilities of using the one or more digital assets within the cache-influenced video game comprises maintaining an asset probability table identifying digital assets, including the one or more digital assets, and the adjusted relative probabilities of using the one or more digital assets.

21. The computing system of claim 12, wherein selecting digital assets to include in the cache-influenced video game outputs uses the adjusted relative probabilities of using the one or more digital assets in combination with one or more additional variables selected from the group comprising player history, player standing, and player skill.

* * * * *